United States Patent

Bland

[15] 3,688,036

[45] Aug. 29, 1972

[54] BINARY DATA TRANSMISSION SYSTEM AND CLOCKING MEANS THEREFOR

[72] Inventor: George F. Bland, 4 Edgepark Road, White Plains, N.Y. 10603

[22] Filed: June 30, 1970

[21] Appl. No.: 51,247

[52] U.S. Cl. ............178/68, 340/147 SY, 340/167 P

[51] Int. Cl. .........H04l 15/00, H04q 5/06, H04q 9/06

[58] Field of Search .......178/68; 340/147 SY, 167 P, 340/168

[56] References Cited

UNITED STATES PATENTS 3,497,618 2/1970 Thayer ........................178/68

2,700,696 1/1955 Barker ..................178/68 UX

*Primary Examiner*—Donald J. Yusko

*Attorney*—Hanifin and Jancin and Roy R. Schlemmer, Jr.

[57] ABSTRACT

A serial binary data transmission system which is self-clocking and recovers clock signals by rectification of a transmitted bipolar signal. By use of the present system, a plurality of stations may be served by a single master clock. Being base band, there are no tuned circuits in the present system nor is there a need for individual clocks at remote terminals of stations.

3 Claims, 5 Drawing Figures

INVENTOR
GEORGE F. BLANC

BY

ATTORNEY

BINARY DATA TRANSMISSION SYSTEM AND CLOCKING MEANS THEREFOR

BACKGROUND OF THE INVENTION

In the transmission of binary messages of predetermined lengths over significant physical distances, it is common practice to transmit the messages in serial form over two wire transmission lines, (e.g., twisted pair, coaxial cable, etc.) in order to minimize the quantity of wire used and the number of connections required. With such transmission systems, a register at the transmission station is required which contains the message to be transmitted and a register at the receiving station is required to receive said message and further means must be provided for serializing and deserializing the messages prior to and after transmission. A significant requirement of such transmission systems is the provision of adequate clocking or synchronizing information to aid in the correct deserialization of the transmitted messages.

A further advantage offered by such pulse techniques is that a train of information-bearing pulses which have been degraded to some extent in the course of transmission may be regenerated provided that the degradation of the signal has not gone too far. Accordingly, pulse transmission systems have been developed which interpose regenerators at suitable intervals which due to their design tend to eliminate or appreciably reduce the signal degradation due to such factors as noise, phase shifting and the like.

Because noise can alter the phase of a pulse as well as its amplitude, correct regeneration of information bearing pulses requires amplitude regeneration and at the same time, the pulses must be correctly located on a time scale. Thus, with such data transmission systems a timing or synchronizing means is necessary both for purposes of pulse regeneration and also for properly serializing and deserializing the transmitted pulse trains.

One system used in the past for properly synchronizing such data transmission both for regeneration and also serializing and deserializing is to include periodic synchronizing pulses with the data which are used to lock in local oscillators and clocks. Another method utilized in the prior art is the concurrent transmission of a train of timing or "clock" pulses together with the data. These clock pulses may then be utilized either for synchronizing a local timing clock or may be separated from the information or data stream at a receiving or repeater station. However, it is usually difficult to mix both the clock and data stream together since most previous systems have been unipolar and loss of either data or clock pulses results as a result of noise.

One prior example of a pulse transmission system utilizing a composite clock and data pulse stream is shown in U.S. Pat. No. 3,179,889 of B. G. King. In this system a frequency doubling effect occurs and in effect the clock pulse is phase delayed and then superimposed upon or mixed with the information signal. The result of this frequency doubling is a severe limitation on the band width available to data.

SUMMARY AND OBJECTS

It has now been found that an improved communication system may be realized especially for use in the transmission of binary data to a number of remote locations connected to a single transmission line by transmitting a composite data and clock signal wherein the data and the clock are automatically synchronized and a single master clock is all that is necessary for the entire communication system. By utilizing a base band transmission scheme, no high frequency carrier is required and the use of tuned circuit components is obviated.

It is accordingly a primary object of the present invention to provide a serial binary data transmission system having a plurality of stations connected to a single transmission line and having only a single master clock serving the complete system.

It is a further object to provide such a system wherein a composite data and clock transmission signal is utilized.

It is yet another object to provide such a system wherein no frequency doubling effect is caused by the formation of the composite clock and data signal.

It is a still a further object to provide such a system wherein the transmitted signal is bipolar having three distinct signal levels one of which is ground.

It is another object to provide such a system wherein said data signal and clock are automatically synchronized at each receiving station.

It is a further object to provide such a system wherein said clock signal is recovered by rectification of two components of said transmitted signal and subsequent recombination of same.

It is another object to provide such a system which is capable of very high data rates but which has no tuned circuit elements.

The foregoing and other objects, features and advantages of the invention will be apparent from the following more particular description of a preferred embodiment of the invention as illustrated in the accompanying drawings.

DESCRIPTION OF THE DISCLOSED EMBODIMENT

The objects of the present invention are accomplished in general by a data transmission system for transmitting serial binary data. Said system comprises a transmission line, a master clock for providing timing pulses at the data rate and at least two transmit-receive stations connected to said line. Said system includes binary data signal source means wherein the two binary data states are represented in a unipolar signal by a ground potential and a first potential relative to ground. The master clock source includes means for producing a unipolar clock signal which alternates between ground and an opposite potential relative to said data signal. The system further includes means for providing a start pulse prior to any message transmission and wherein the width of the data, clock and start pulses is one half the width of the total allotted pulse period or less. Each said transmit-receive station includes means for combining the data and clock signals to form a composite signal so that a first binary state is represented in the composite signal by a pulse that is substantially the same duration as a clock pulse and having a first potential with respect to ground and wherein the other binary state is represented by a pulse of substantially the clock signal duration and of the opposite polarity with respect to ground. Each said transmit-receive station is further provided with means for demodulating said composite transmitted signal including rectification means for separating the two sets of opposite polarity data pulses wherein one of said separate sets substantially replicates the original data signal and further means is included for combining the two rectified signals to produce a composite unipolar clock signal.

The two opposite polarity unipolar pulses, i.e., data and clock are thus combined to form a bipolar ground return pulse train wherein the composite signal may be rectified by a receiving means located in each station to in effect full wave rectify the source or transmitted composite signal to produce a series of unipolar pulses which from the standpoint of rectification and recombination are similar to a full wave rectified sinusoidal a.c. signal with the exception that there is a ground potential appearing upon the output of said rectification means of substantially the same width as one of the unipolar pulses.

Figure 1:
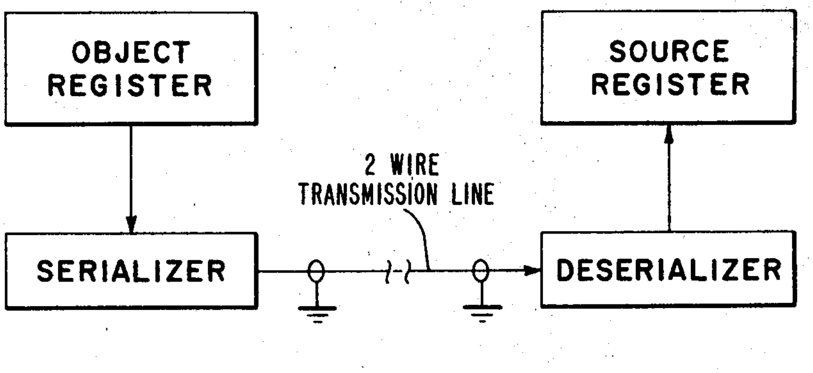
FIG. 1 is a block diagram illustrating the make up of a particular data transmission system to which the present invention is applicable.

A data transmission system constructed in accordance with the principles of the present invention may be organized as shown and in FIG. 1 and would normally include a Source Register which contains the message to be transmitted and an Object Register to receive the message and means to serialize and deserialize the message. The Serializer and Deserializer shown comprise means for extracting a message from or placing it into a register a bit at a time.

A key requirement of such a system is the provision of clocking or synchronizing information to aid in the correct deserialization of the transmitted message or serialization of a message to be transmitted. The generalized transmit and receive hardware shown in FIG. 1 could either be the transmit and receive portions of two different stations connected to the transmission line or could be within the same station where such station was to in effect have a repeater or relay function such as that shown in FIG. 5. It will be noted in FIG. 5 that both the Object and Source Registers shown in the serializer and deserializer means include the two blocks marked Shift Control which supply clock pulses to the shift registers to control the gating of data into and out of same.

Figure 2:
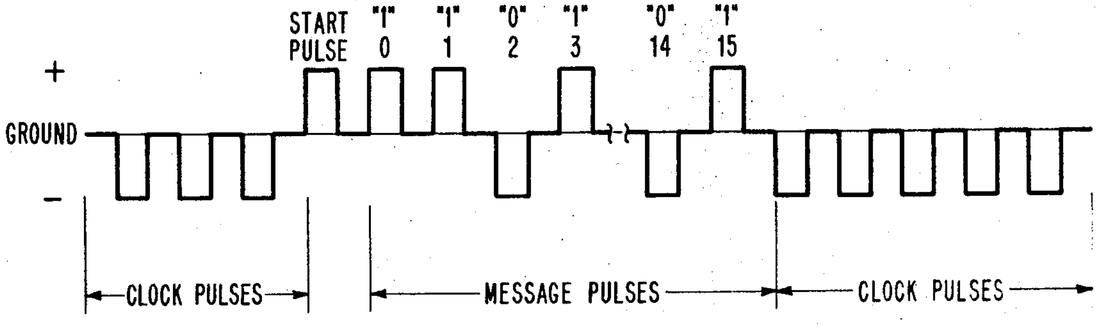
FIG. 2 shows a waveform of a typical signal which would be transmitted.

The present invention sets forth a method for providing the required clocking information and is based on the use of a transmitted signal having the general format illustrated in FIG. 2.

Referring now to FIG. 2, it will be noted starting at the left that there is a series of unipolar clock pulses which are varying between ground and some negative potential. Next, a unipolar start pulse is illustrated which goes in the positive direction. Following this, there appears a series of message pulses in the present instance noted as 16 bits, i.e., 0–15. Above each of the bit numbers appears a binary value representation. Thus it may be seen that in the composite signal of the present invention, the positive going signal is used to denote a binary "1" and a negative going signal represents a binary "0."It will of course be readily understood that this could be easily reversed. For the sake of the present illustration, it is assumed that the messages have a predetermined length of 16 bits and that preceding each such message, there would be a "-start" pulse. In the absence of a message, the transmitted signal consists of a continuous sequence of negative (with respect to ground) pulses. A series of such pulses is illustrated in FIG. 2 on each side of the actual message pulses. All of the pulses are designed to have a fixed width which is less than the minimum pulse separation by some factor. In the present embodiment a width to separation ratio of one half is illustrated. It will be noted, referring to FIG. 2, that the "start" pulse is time coincident with, and of approximately the same magnitude as a clock pulse but of opposite polarity with respect to a clock pulse. Similarly, the binary one is time coincident with and of equivalent amplitude to the clock pulse but like a "start" pulse is of opposite polarity to a clock pulse. The binary zero pulse is substantially identical to a clock pulse and also of the same polarity. It will thus be observed that the resultant composite bipolar signal comprises in essence a series of positive and negative going pulses each of which returns to ground. The way in which this composite signal is formed will be more fully described with reference to the description of FIG. 4 which will follow.

It should be noted that the transmitted signal is what is referred to as a base band transmission, i.e., it is not carried on a high frequency carrier but is transmitted in the illustrated form over the line, and an anticipated data rate for such a signal would be on the order of 100 megabits per second.

Figure 3:
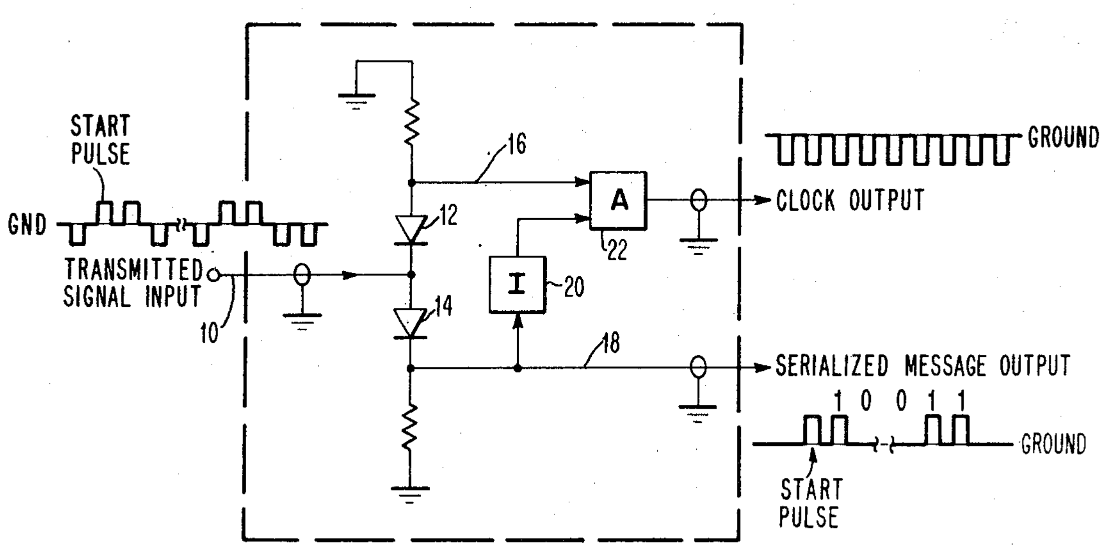
FIG. 3 is a logical schematic diagram of a Minus Clock Circuit for extracting the clock and the data from the transmitted composite signal.
Figure 5:
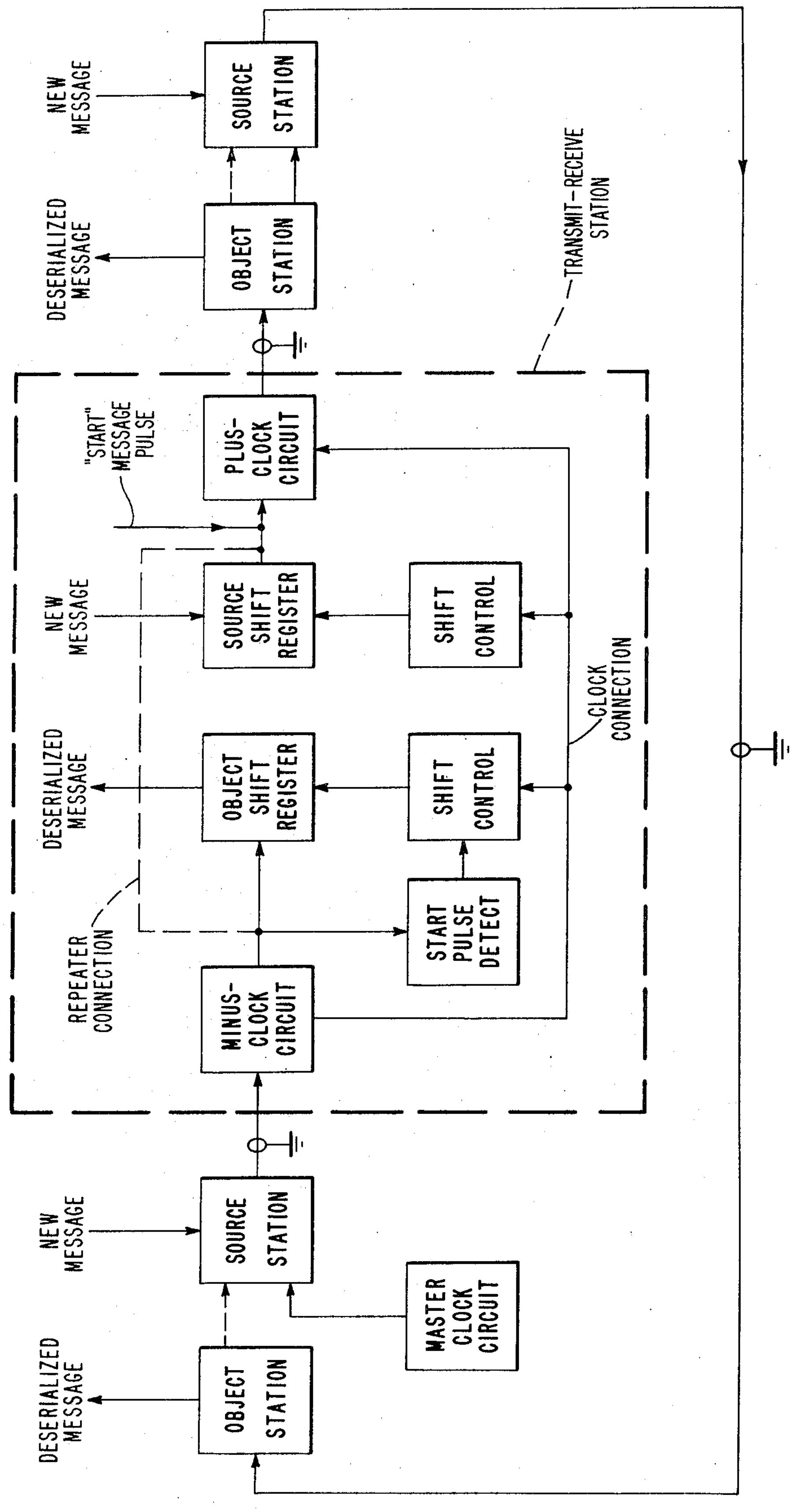
FIG. 5 is a block diagram illustrating the primary functional units of a typical serial data transmission system wherein a remote receiving or relay station is shown within the dotted lines.

Referring now to FIG. 3, which illustrates the details of the Minus Clock Circuit and to FIG. 5 which shows the overall organization of a transmit-receive station, the object station or deserializer is conditioned by the occurrence of the "start" pulse which is detected by the Minus Clock Circuit and fed to the Start Pulse Detect Mechanism. This latter unit initiates the Shift Control which gates the clock pulses into the Object Shift Register and resets said shift register to zero on the occurrence of the Start Pulse.

Then as each successive bit of the serialized message is received in the Shift Register from the Minus Clock Circuit, the clock mechanism causes the Shift Register to shift accordingly until the complete message is contained therein at which point it may be read out in either serial or parallel fashion as the complete received message. Normally, within a typical computer system, the message would be read out in either word parallel or byte parallel mode as will be appreciated by those skilled in the art.

It should be noted at this time that the clock pulses and the serialized message output, as shown on FIG. 3, are time coincident by definition since they are in effect generated by the same signal input. Accordingly, the system is essentially self synchronizing, and assuming a repeater function were to be desire, the pulses could be fed through reshaping circuits although these are not shown.

Figure 4:
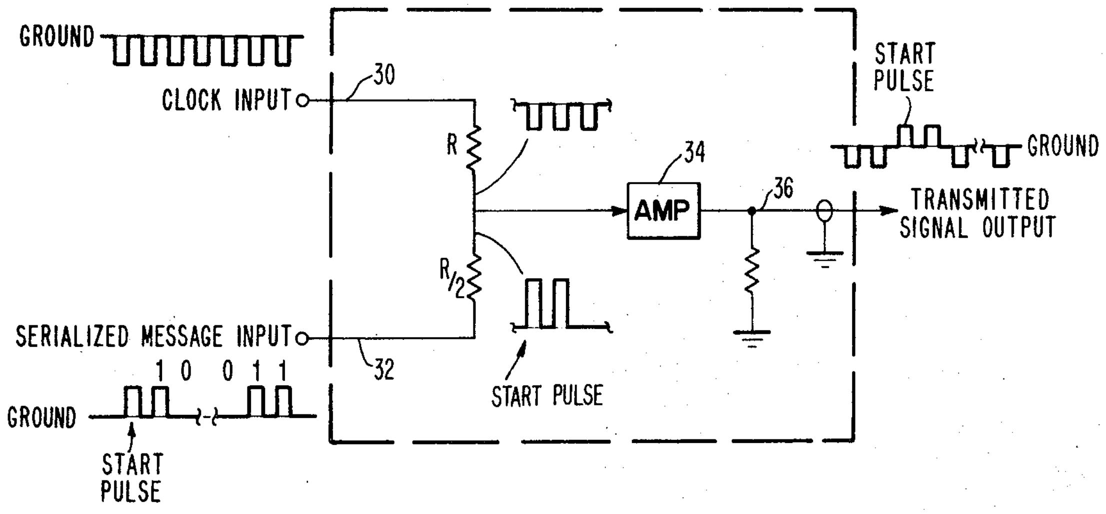
FIG. 4 is a logical schematic diagram of a Plus Clock Circuit which would be utilized to modulate or combine the clock and binary data signal as anticipated by the present invention.

Assume now that the Transmit-Receive station shown in FIG. 5 is to transmit a message onto the line. The message would be loaded in an appropriate manner into the Source Shift Register and again the clock pulses would pass through the righthand Shift Control and the individual data bits would be shifted into the Plus Clock Circuit after having been preceded by a "start" message pulse. The details of the Plus Clock Circuit are shown in FIG. 4 and will be described subsequently. However, the essential function is to combine the message pulses from the shift register and the clock pulses to form the previously described bipolar signal.

It should be noted at this time that if the transmit-receive station were to be used as a relay, the connection shown in the dotted line as the Repeater Connection directly connecting the message output of the Minus Clock Circuit with the message input of the Plus Clock Circuit would be utilized. The Plus Clock Circuit is disclosed as having a built-in amplifier for the purpose of amplifying and shaping the pulses before they are retransmitted to other stations on the line.

The details of operation of the Minus Clock Circuit are shown on FIG. 3. The composite signal input comes in on the input line 10. It is then rectified by the two oppositely directed rectifiers 12 and 14 which in effect pass those portions of the input below and above ground respectively. Thus, the negative portions of the input signal appear on line 16 and the positive portions on line 18. The output on line 18 is an actual replication of the original unipolar message input as illustrated in the figure wherein a positive potential represents a binary 1 and a ground potential represents a binary 0. The signal on line 18 is inverted through the inverter 20 and is applied as one input to the AND circuit 22, the other input of which is received from line 16. The AND circuit 22 is a positive AND circuit for this purpose, and produces the composite output shown adjacent the Clock Output line. The positive AND circuit would be the normal resister-diode type in which the normal output is always equal to the most negative of its inputs. In other words, the two inputs correspond at ground which causes the positive, i.e., ground output between pulses and returns to the negative output state during the actual non-coincident data pulses.

It will thus be seen that the clock output is literally comprised of the input data pulses appropriately flopped over to the same side of the reference ground potential. They are accordingly, by definition, in exact time phase and any slight phase shifting of any of the individual data pulses during transmission should not materially affect the operation of the system. .

Referring now to FIG. 4, the operation of the Plus Clock Circuit is shown. The negative going series of unipolar pulses comprising the clock signal are directed to the line 30 labelled Clock Input. At the same time, the serialized message input is fed to the input line 32. The format of both the clock signals and the message input as being opposite polarity unipolar pulses is clearly illustrated. These are passed through the voltage divider network labelled R and R/2 feeding the input of the amplifier 34. The resistance network is essentially a current divider wherein the current signal passing through R/2 will be essentially twice the amplitude of that passing through the resistance R and of course opposite polarity. The result is that the positive going message pulses representing a binary one and also the "start" pulses cancel out and overcome the negative going clock pulses and produce a resultant pulse substantially equal in magnitude and of opposite polarity to a clock pulse. When a binary zero occurs in the message input, there is no pulse emanating from R/2 to overcome the clock pulse as the " 0" is represented by a ground level signal and the clock pulse or negative going pulse produces the negative pulse in the composite output signal on line 36 and is similarly clearly illustrated in the waveform adjacent said line. Thus, the very simple current divider circuit and amplifier of FIG. 4 produces the requisite composite signal of the present invention. It will be seen that both the Minus Clock Circuit and the Positive Clock Circuit contain no tuned elements the only requirement being that the various circuit elements have required high frequency characteristics, such as fast rise time, etc. to avoid any substantial pulse distortion.

It will be noted that the input to the Minus Clock Circuit would normally come from the transmission line as this would be the usual source of the composite signal. The respective clock output and serialized message output from the Minus Clock Circuit could either be utilized to serve the Repeater function by recombining them and passing them back to the line or the data itself could be utilized at the particular transmit-receive station. Similarly, the input to the Plus Clock Circuit could either come from the Minus Clock Circuit in the event of a repeater function or it could emanate from some other unit, i.e. a source of data signals attached to the particular transmit-receive circuit.

The simplicity of the essential components of this system are self evident from the previous description. It will be noted that the particular shift registers and shift controls would be completely conventional and are thought to be well within the knowledge of persons skilled in the art. As stated previously, the circuitry in essence contains no tuned or tunable circuit elements with the resultant possibility of misalignment or mistuning being obviated. Additionally, the clock pulses and data pulses are essentially self synchronizing. Further only a single clock source at the principal data originating station need be utilized. Ground in the resultant transmitted bipolar signal is used as a reference level and not as an information level which avoids certain other error possibilities.

The circuit elements are essentially linear in nature and the transmission line itself, although illustrated as two wires, could be a single wire with a ground return although for obvious frequency dependent reasons a coaxial cable would normally be utilized. Also as stated previously, the system is satisfactory for message data rates up to 100 megabits which would be very difficult to obtain with any sort of a carrier system.

While the presently disclosed embodiment is believed to be a very straightforward and simple utilization of the concepts of the present invention, it should be recognized that certain modifications and changes could be made without departing from the spirit and scope thereof. For example, as stated previously, in the specification, the polarity of ones and zeroes could readily be changed as could the polarity of the clock signals. Further, modulating and demodulating circuits could be utilized other than those shown.

Finally, the present system produces a composite data and clock signal wherein no frequency doubling effect is attendant therewith as is the case in a number of prior art communication systems. This is important in any sort of data communication system. With the present system, the entire band width may be utilized for data rather than only half of same.

While the invention has been particularly shown and described with reference to a preferred embodiment thereof, it will be understood by those skilled in the art that various changes in form and details may be made therein without departing from the spirit and scope of the invention.

What is claimed is:

1. A serial binary data transmission system comprising a transmission line, a master clock for providing timing pulses at the data rate and at least two transmit-receive stations connected to said transmission line and a binary data signal source means, wherein the two binary data states are represented respectively by unipolar signals having a ground potential and a first potential relative to ground and wherein said clock includes means for producing a unipolar clock signal which alternates between ground and the opposite potential relative to said data signal, means for providing a start pulse prior to any message transmission wherein the width of the data, clock and start pulses is up to one half the width of the allotted pulse period, each said station including means for combining the data and clock signals to form a composite signal so that a first binary state is represented in the composite signal by a unipolar pulse that is of substantially the same duration as a clock pulse and of a first polarity with respect to ground and wherein the other binary state is represented by a pulse of substantially the same duration as a clock pulse and of the opposite polarity with respect to ground, said station further including means for separating the components of said composite transmitted signal into two separate sets wherein one of said separate sets represents the original input data signal, and the other set represents the clock signal and means for reversing the polarity of said data set and for combining the two rectified signal sets to produce a composite unipolar clock signal and wherein each said transmit-receive station contains a receiving and a transmitting serial memory means and means for serially entering binary data in and extracting data from said serial memory means under control of said clock signals.

2. A serial binary data transmitter including means for combining a unipolar clock signal stream having a bit rate F with a unipolar message stream having a bit rate F, the pulses in said two signals being substantially in phase and of the same duration and amplitude, said two signals being connected across a voltage divider means such that whenever a pulse occurs in the message signal it completely overrides the clock signal and produces a pulse of opposite polarity to and of substantially the same amplitude as a clock signal and whereby the amplitude and polarity of the clock signal is unchanged in those locations where no message input signal pulse occurs, and means for amplifying said composite signal and placing same upon the input to a transmission line.

3. A receiving station for use with a data transmission system for separating a composite serial binary data and clock pulse signal wherein a first binary state is represented in the composite signal by a pulse that is of substantially the same duration as a clock pulse and of a first polarity with respect to ground and wherein the other binary state is represented by a pulse of substantially the same duration as a clock signal and of the opposite polarity with respect to ground, means comprising an input line for receiving such composite signal, two rectifier means connected in front to back relationship with their common connection in turn connected to said input line, two output lines connected to said rectifier means at the opposite ends from their common connection, means for inverting the signals appearing on one of said output lines and means for combining the signal on the other of said output lines with the output of said inverting means and for combining same to form a series of unipolar pulses, each one of which corresponds to a data pulse of the said first or second polarity received on the input line, said last named pulse series providing a clock output, the other line to which the inverting means is connected comprising a serialized data output.

* * * * *